(12) United States Patent
Murakami et al.

(10) Patent No.: US 8,730,434 B2
(45) Date of Patent: May 20, 2014

(54) OPTICAL COMPENSATION FILM

(75) Inventors: Nao Murakami, Ibaraki (JP); Motoko Kawasaki, Ibaraki (JP); Hiroyuki Yoshimi, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 231 days.

(21) Appl. No.: 13/081,673

(22) Filed: Apr. 7, 2011

(65) Prior Publication Data

US 2011/0285947 A1 Nov. 24, 2011

(30) Foreign Application Priority Data

Apr. 9, 2010 (JP) ................................ 2010-090063

(51) Int. Cl.
*G02F 1/1335* (2006.01)
*G02F 1/13363* (2006.01)

(52) U.S. Cl.
CPC ...... *G02F 1/133632* (2013.01); *G02F 1/13363* (2013.01); *G02F 1/133634* (2013.01)
USPC ............................ 349/117; 349/118; 349/119

(58) Field of Classification Search
CPC .......... G02F 1/133632; G02F 1/13363; G02F 1/133634
USPC ........................................... 349/117–119, 96
See application file for complete search history.

(56) References Cited

U.S. PATENT DOCUMENTS

| | | | |
|---|---|---|---|
| 5,506,706 A | 4/1996 | Yamahara et al. | |
| 5,518,783 A | 5/1996 | Kawata et al. | |
| 5,699,136 A | 12/1997 | Arakawa et al. | |
| 5,995,184 A | 11/1999 | Chung et al. | |
| 6,493,053 B1 * | 12/2002 | Miyachi et al. | ............... 349/117 |
| 7,270,858 B2 | 9/2007 | Yamaoka et al. | |

(Continued)

FOREIGN PATENT DOCUMENTS

CN 101326461 A 12/2008
JP 2565644 B2 12/1996

(Continued)

OTHER PUBLICATIONS

Korean Office Action dated May 29, 2012, issued in corresponding Korean Patent Application No. 2011-0032268, with English translation (16 pages).

(Continued)

*Primary Examiner* — Thanh-Nhan P Nguyen
(74) *Attorney, Agent, or Firm* — Westerman, Hattori, Daniels & Adrian, LLP

(57) ABSTRACT

An optical compensation film according to an embodiment of the present invention includes: non-liquid crystal polymers arranged in a tilt alignment, wherein the optical compensation film satisfies the following expressions (1) and (2):

$$3\,[nm] \leq (nx-ny) \times d; \quad (1)$$

and $$5° < \beta, \quad (2)$$

where, when an X-axis and a Y-axis, which are plane direction axes of a three-dimensional coordinate system, are perpendicular to each other and an axis vertical to the X-axis and the Y-axis in a thickness direction is defined as a Z-axis, nx and ny indicate a maximum refractive index and a minimum refractive index in an XY-plane of the optical compensation film, respectively, d indicates a film thickness [nm], and β indicates an angle formed between a direction for providing the minimum refractive index ny and a direction for providing a maximum refractive index nb in a YZ-plane of the optical compensation film.

17 Claims, 9 Drawing Sheets

(56) References Cited

U.S. PATENT DOCUMENTS

| | | | |
|---|---|---|---|
| 7,643,118 | B2 | 1/2010 | Nagase et al. |
| 2005/0117099 | A1 | 6/2005 | Yamaoka et al. |
| 2009/0109385 | A1 | 4/2009 | Nagase et al. |
| 2010/0085522 | A1* | 4/2010 | Uesaka et al. ............ 349/119 |

FOREIGN PATENT DOCUMENTS

| | | |
|---|---|---|
| JP | 2802719 B2 | 9/1998 |
| JP | 2000-105315 A | 4/2000 |
| JP | 2003-315557 A | 11/2003 |
| JP | 2007-225862 A | 9/2007 |
| KR | 10-2004-0077814 A | 9/2004 |

OTHER PUBLICATIONS

Chinese Office Action dated Jan. 15, 2013, issued in corresponding Chinese Patent Application No. 201110094663.0.

Chinese Office Action dated Jul. 2, 2013, issued in corresponding Chinese Patent Application No. 201110094663.0, w/ English translation.

Japanese Office Action dated Aug. 14, 2013, issued in corresponding Japanese Patent Application No. 2010-090063, w/ English translation.

* cited by examiner

OPTICAL COMPENSATION FILM

This application claims priority under 35 U.S.C. Section 119 to Japanese Patent Application No. 2010-090063 filed on Apr. 9, 2005, which is herein incorporated by reference.

BACKGROUND OF THE INVENTION

1. Field of the Invention

The present invention relates to an optical compensation film, an optical compensation film-integrated polarizing plate using the optical compensation film, and a liquid crystal display apparatus.

2. Description of the Related Art

Up to now, when a liquid crystal display apparatus is viewed in an oblique direction, there are a reduction in contrast and a change in hue and a viewing angle characteristic thereof is not sufficient as compared with a CRT display apparatus. Therefore, the improvement of the viewing angle characteristic is strongly desired. The viewing angle characteristic of the liquid crystal display apparatus is principally caused by the dependence on angle of birefringence of a liquid crystal cell. For example, a TN-mode liquid crystal display apparatus is excellent in display response speed and contrast and high in productivity, and thus widely used as a display unit of various apparatuses including OA devices such as a personal computer and a monitor. However, in a TN-mode liquid crystal cell, liquid crystal molecules are arranged in a tilt alignment with respect to upper and lower electrode substrates, and hence there is a problem that viewing angle dependence becomes larger, for example, a display image contrast changes depending on an observation angle to color an image area, to thereby reduce visibility. Therefore, it is strongly desired to compensate for the dependence on angle of birefringence (that is, retardation) of the liquid crystal cell using the optical compensation film, to improve the viewing angle characteristic.

One of methods of improving the viewing angle characteristic is to use a tilt alignment type optical compensation film in the TN-mode liquid crystal display apparatus. Examples of the tilt alignment type optical compensation film which have been reported include an optical compensation film containing low-molecular liquid crystal arranged in a tilt alignment in a polymer matrix (Japanese Patent No. 2565644) and an optical compensation film in which an alignment film is formed on a support and discotic liquid crystal is arranged in a tilt alignment on the alignment film to polymerize the discotic liquid crystal (Japanese Patent No. 2802719). However, the TN-mode optical compensation film as described above in which the liquid crystal material is arranged in a tilt alignment has the following problem (Japanese Patent Application Laid-open No. 2000-105315). For example, the selection of the liquid crystal material (for example, selection of liquid crystal material easily arranged in a tilt alignment based on surface energy difference in air interface) and the control of a tilt angle of the liquid crystal material (for example, control of tilt angle using surfactant) are required. An alignment substrate is essential, and hence a manufacturing method is complicated. The variety of control factors is wide, and hence it is difficult to adjust the tilt angle and retardation.

When the liquid crystal material is to be used, it is difficult to separately control liquid crystal molecules with high precision. Therefore, in view of a film, there is a problem that alignment fluctuations of the liquid crystal molecules occur and cause the cancellation of polarization to reduce the contrast of a liquid crystal panel.

Unlike a VA-mode or IPS-mode liquid crystal display apparatus, the TN-mode liquid crystal display apparatus includes a polarizing plate provided so that an absorption axis of a polarizer has an direction of 45° or 135° with respect to a lateral direction of the liquid crystal panel in view of characteristics. When a size of the polarizing plate changes in a high-temperature or a low-temperature environment and/or a high-humidity environment, a stress is applied to the optical compensation film because of the change in size, and hence distortion may occur. Therefore, light leakage occurs to cause brightness unevenness in a horizontal direction and vertical direction of the liquid crystal panel. This is a problem with respect to appearance uniformity.

SUMMARY OF THE INVENTION

The present invention has been made to solve the conventional problems described above. A principal object of the present invention is to provide a novel tilt alignment type optical compensation film using a non-liquid crystal polymer material, which is different from a tilt alignment type optical compensation film using a conventional liquid crystal material. A more specific object of the present invention is to provide a novel tilt alignment type optical compensation film using a non-liquid crystal polymer material, which is useful to improve a viewing angle characteristic of a liquid crystal display apparatus of TN-mode, OCB-mode, or ECB mode.

An optical compensation film according to an embodiment of the present invention includes: non-liquid crystal polymers arranged in a tilt alignment, wherein the optical compensation film satisfies the following expressions (1) and (2):

$$3\ [nm] \leq (nx-ny) \times d; \quad (1)$$

and $$5° < \beta, \quad (2)$$

where, when an X-axis and a Y-axis, which are plane direction axes of a three-dimensional coordinate system, are perpendicular to each other and an axis vertical to the X-axis and the Y-axis in a thickness direction is defined as a Z-axis, nx and ny indicate a maximum refractive index and a minimum refractive index in an XY-plane of the optical compensation film, respectively, d indicates a film thickness [nm], and β indicates an angle formed between a direction for providing the minimum refractive index ny and a direction for providing a maximum refractive index nb in a YZ-plane of the optical compensation film.

An optical compensation film according to another embodiment of the present invention includes: non-liquid crystal polymers arranged in a tilt alignment, wherein, when an X-axis and a Y-axis, which are plane direction axes of a three-dimensional coordinate system, are perpendicular to each other and an axis vertical to the X-axis and the Y-axis in a thickness direction is defined as a Z-axis, the optical compensation film includes two optical axes in a plane which is not parallel to any of an XY-plane, a YZ-plane, and a ZX-plane of the optical compensation film.

In a preferred embodiment, the optical compensation film has a birefringence index Δn in a range of 0.0001 to 0.02.

In a preferred embodiment, the optical compensation film has a photoelastic coefficient in a range of $1 \times 10^{-12}$ m$^2$/N to $9 \times 10^{-11}$ m$^2$/N.

In a preferred embodiment, the optical compensation film satisfies a refractive index relationship of one of nx>ny>nz and nx>ny=nz, where nz indicates a refractive index in a thickness direction.

In a preferred embodiment, the non-liquid crystal polymers include at least one polymer selected from the group consisting of a (meth)acrylic polymer, a styrene-based polymer, an olefin-based polymer, a cyclic olefin-based polymer, a polyarylate-based polymer, a polycarbonate-based polymer, a polysulfone-based polymer, a polyurethane-based polymer, a polyimide-based polymer, a polyester-based polymer, and a polyvinyl alcohol-based polymer.

According to another aspect of the present invention, an optical compensation film-integrated polarizing plate is provided. The optical compensation film-integrated polarizing plate includes: the optical compensation film as described above; and a polarizer provided adjacent to the optical compensation film.

In a preferred embodiment, the optical compensation film includes an alignment axis in a direction vertical to a tilt direction of the non-liquid crystal polymers.

In a preferred embodiment, the optical compensation film serves as a protective film for the polarizer.

According to still another aspect of the present invention, a liquid crystal display apparatus is provided. The liquid crystal display apparatus includes: a liquid crystal cell; and the optical compensation film as described above, which is provided on at least one of sides of the liquid crystal cell.

A liquid crystal display apparatus according to another embodiment of the present invention includes: a liquid crystal cell; and the optical compensation film-integrated polarizing plate as described above, which is provided on at least one of sides of the liquid crystal cell.

In a preferred embodiment, the liquid crystal cell is in a driving mode selected from the group consisting of a TN mode, an OCB mode, and an ECB mode.

According to the present invention, the novel tilt alignment type optical compensation film using the non-liquid crystal polymer material, which is different from the tilt alignment type optical compensation film using the conventional liquid crystal material, may be provided.

DESCRIPTION OF THE PREFERRED EMBODIMENTS

Hereinafter, preferred embodiments of the present invention are described. However, the present invention is not limited to these embodiments.

(Definitions of Terms and Symbols)

The definitions of terms and symbols used herein are as follows.

(1) Axes (X, Y, and Z)

In a three-dimensional coordinate system, a symbol "X" indicates an axis in a direction along a plane, "Y" indicates an axis perpendicular to the X-axis on the plane, and "Z" indicates an axis located vertical to the X-axis and the Y-axis in a thickness direction (normal direction).

(2) Refractive Indices (nx, ny, and nz)

A symbol nx indicates a refractive index along the X-axis, which is a maximum refractive index in a film plane. A symbol ny indicates a refractive index along the Y-axis, which is a refractive index in a direction perpendicular to the "nx" direction in the film plane. A symbol nz indicates a refractive index along the Z-axis, which is a refractive index in the thickness direction.

(3) In-plane Retardation (Re)

An in-plane retardation (Re) refers to an in-plane retardation value of a layer (film) at 23° C., and at a wavelength of 590 nm unless otherwise specified. Re is obtained by the expression: Re=(nx−ny)×d, where d (nm) represents the thickness of the layer (film). Note that, as used herein, Re[λ] refers to an in-plane retardation of a layer (film) at 23° C. and a wavelength of λ nm.

(4) Thickness Direction Retardation (Rth)

A thickness direction retardation (Rth) refers to a thickness direction retardation value of a layer (film) at 23° C., and at a wavelength of 590 nm unless otherwise specified. Rth is obtained by the expression: Rth=(nx−nz)×d, where d (nm) represents the thickness of the layer (film). Note that, as used herein, Rth[λ] refers to a thickness direction retardation of a layer (film) at 23° C. and a wavelength of λ nm.

(5) Nz Coefficient

An Nz coefficient is obtained by the expression: Nz=Rth/Re.

(6) Refractive Indices (na, nb, and nc)

A symbol nb is a maximum refractive index in a YZ-plane of the film, which is a refractive index in a direction perpendicular to the "nx" direction (slow axis direction), nc indicates a refractive index in a direction perpendicular to the "nb" direction in the YZ-plane of the film, and na indicates a refractive index in a direction perpendicular to the "nb" direction and the "nc" direction (that is, "nx" direction).

(7) Average Tilt Angle (β°)

Figure 1A:
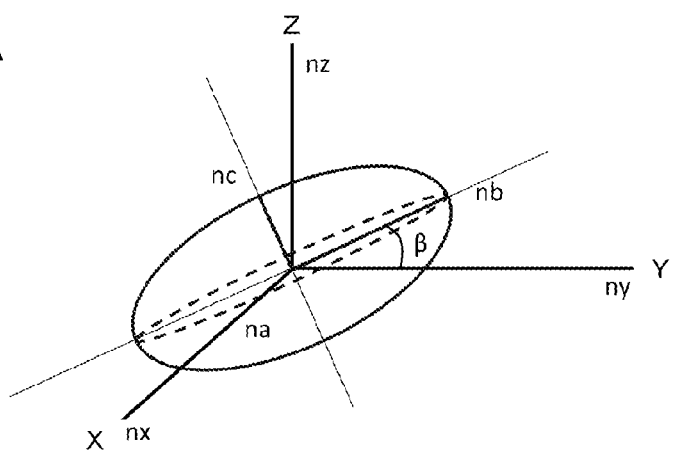
FIG. 1A is a schematic view illustrating an average tilt angle.
Figure 1B:
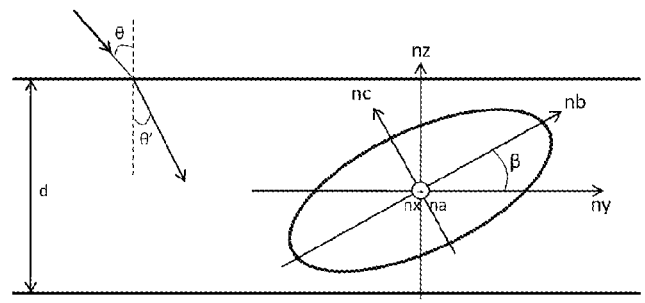
FIG. 1B is a schematic view illustrating the average tilt angle.

An average tilt angle β is an average of tilt alignment angles of all molecules (for example, non-liquid crystal polymer molecules) in view of statistics. To be specific, the average tilt angle β is an average tilt alignment angle of all molecules located in the thickness direction (molecules in bulk state), which is an angle formed between the "nb" direction and the "ny" direction as illustrated in FIGS. 1A and 1B.

A. Optical Compensation Film

An optical compensation film according to the present invention includes non-liquid crystal polymers which are arranged in a tilt alignment, and satisfies Expressions (1) and (2) described below.

$$3\ [nm] \leq (nx-ny) \times d \quad (1)$$

$$5° < \beta \quad (2)$$

With respect to Expression (1), "(nx−ny)×d" (that is, in-plane retardation value Re of the optical compensation film) may be equal to or larger than, for example, 5 nm, preferably in a range of 10 nm to 200 nm, more preferably in a range of 10 nm to 160 nm. With respect to Expression (2), the average tilt angle β may be equal to or larger than, for example, 10°, preferably in a range of 10° to 70°, more preferably in a range of 20° to 60°. According to the optical compensation film having the optical characteristics as described above in the present invention, when the alignment of the respective liquid crystal molecules is assumed as a total retardation, a liquid crystal cell serving as a tilt type retardation plate having positive biaxial anisotropy may be appropriately subjected to viewing angle compensation in all azimuths. As an example of the liquid crystal cell as described above, a TN-mode liquid crystal cell is preferred. In the present invention, the non-liquid crystal polymers may be arranged in a tilt alignment at a predetermined angle, or may be arranged in a tilt alignment at an angle which continuously or intermittently increases or decreases along the thickness direction (so-called, hybrid-alignment). The non-liquid crystal polymers are preferably arranged in a tilt alignment at a predetermined angle.

The calculation of the average tilt angle (β°) is described below. As illustrated in FIG. 1B, when the tilts of the molecules in the thickness direction of the film are averaged to assume a single refractive-index ellipsoid, a retardation value δ measured with respect to incident light at an angle θ is expressed by Expression (I) described below. Therefore, for example, the average tilt angle (β°) may be calculated by Expressions (I) and (II) described below based on retardation values measured at 5° intervals in a polar angle range of −50° to +50° (normal direction corresponds to 0°) in a direction vertical to the slow axis. In the expressions, $n_a$, $n_b$, and $n_c$ indicate refractive indices of members included in the film, that is, the refractive indices nx, ny, and nz of the film in a case of β=0, and d indicates a film thickness (nm).

$$\delta = \frac{d}{\cos\theta'}\left(\frac{n_b n_c}{\sqrt{n_b^2 \sin^2(\theta' - \beta) + n_c^2 \cos^2(\theta' - \beta)}} - n_a\right) \quad (I)$$

$$\theta' = \arcsin\left(\frac{\sin\theta}{(n_a + n_b + n_c)/3}\right) \quad (II)$$

In the present invention, a birefringence index Δn of the optical compensation film is preferably in a range of 0.0001 to 0.02 at a wavelength of 590 nm, more preferably in a range of 0.0001 to 0.018. The birefringence index Δn is obtained by an expression: Δn=nx−nz. A birefringence index Δn of the liquid crystal cell and the birefringence index Δn of the optical compensation film normally depend on wavelength. However, when the birefringence index Δn of the optical compensation film is within the ranges described above, the dependence on wavelength of the birefringence index Δn of the liquid crystal cell and the dependence on wavelength of the birefringence index Δn of the optical compensation film may be tuned to each other. As a result, a change in birefringence index Δn and a shift in phase, which are caused by a viewing angle in a liquid crystal display apparatus (particularly, TN-mode liquid crystal display apparatus), may be reduced over the entire wavelength range of visible light to prevent a coloring phenomenon from occurring. Such an effect may be more suitably exhibited in a case where a ratio between the birefringence indices Δn at wavelengths of 550 nm and 450 nm (Δn450/Δn550) is preferably in a range of 0.80 to 1.2, more preferably in a range of 0.90 to 1.15.

In the present invention, a photoelastic coefficient of the optical compensation film is preferably in a range of $1 \times 10^{-12}$ $m^2/N$ to $9 \times 10^{-11}$ $m^2/N$. A tilt alignment type optical compensation film using a conventional liquid crystal material (for example, product name "WV-film" produced by Fuji Photo Film Co., Ltd.) has a problem with respect to appearance uniformity because a support base is essential and the support base and a liquid crystal material are large in photoelastic coefficient. In contrast, according to the optical compensation film having the photoelastic coefficient in the range described above in the present invention, even when a stress is applied to the optical compensation film because of a change in size of the polarizing plate, light leakage or brightness unevenness may be prevented from occurring. As a result, a liquid crystal display apparatus having excellent appearance uniformity may be obtained.

The appearance uniformity may be evaluated as follows. For example, a liquid crystal display apparatus on which a polarizing plate is mounted is exposed to a heating environment (for example, 80° C.×200 hours) or a humidifying environment (for example, 60° C./90% RH×200 hours), and then a black image is displayed thereon at room temperature. Examples of an evaluation method include a visual evaluation and a brightness distribution evaluation. In the visual evaluation, a black image displayed on the entire liquid crystal display apparatus may be visually inspected at a distance of approximately several meters to determine whether or not there is a light leakage portion. In the brightness distribution evaluation, a ratio between minimum brightness and maximum brightness on a black display screen is indicated as a brightness ratio (maximum brightness/minimum brightness). When the brightness ratio is close to 1.0, the uniformity may be evaluated to be excellent.

The optical compensation film according to the present invention is preferred to satisfy a refractive index relationship of "nx>ny>nz" or "nx>ny=nz". Note that, "ny=nz" includes not only a case where ny and nz are strictly equal to each other but also a case where ny and nz are substantially equal to each other. That is, "ny=nz" corresponds to a case where an Nz coefficient (Rth/Re) exceeds 0.9 and is smaller than 1.1. When the optical compensation film according to the present invention satisfies the refractive index relationship of "nx>ny>nz", the Nz coefficient is preferably in a range of 1.1 to 10, more preferably in a range of 1.1 to 8. When the refractive index relationship described above is satisfied, according to the optical compensation film of the present invention, the liquid crystal cell serving as the tilt type retardation plate having positive biaxial anisotropy may be appropriately subjected to viewing angle compensation in all azimuths in the case where the alignment of the respective liquid crystal molecules is assumed as the total retardation. As an example of the liquid crystal cell as described above, a TN-mode liquid crystal cell is preferred.

In a preferred embodiment, the optical compensation film according to the present invention may have two optical axes in a plane which is not parallel to any of the XY-plane, YZ-plane, and ZX-plane of the film (that is, in a plane including "nb" direction and "nx" direction). This optical compensation film may have a maximum refractive index nx (na) as an alignment axis vertical to the tilt direction ("nb" direction) of the non-liquid crystal polymers. For example, when non-liquid crystal polymers exhibiting negative biaxial refractive index anisotropy are arranged in a tilt alignment at a predetermined angle, the alignment axis direction of the optical compensation film may be adjusted to a direction vertical to a tilt direction. The liquid crystal display apparatus of, for example, TN-mode may be more suitably subjected to viewing angle compensation by the optical compensation film.

Any suitable non-liquid crystal polymers may be used as the non-liquid crystal polymers included in the optical compensation film according to the present invention. For example, a thermoplastic resin capable of forming a film having a light transmittance equal to or larger than 70% may be preferably used. For example, a thermoplastic resin may be preferably used in which a glass transition temperature (Tg) is in a range of 80° C. to 170° C., a melting temperature is in a range of 180° C. to 300° C., and a melting viscosity at a shear rate of 100 sec$^{-1}$ and at 250° C. is equal to or smaller than 10,000 Pa·s. Such a thermoplastic resin is easy to form a film, and hence an optical compensation film having excellent transparency may be obtained by a general forming method, for example, extrusion. When the non-liquid crystal polymers having the photoelastic coefficient in the range of $1\times10^{-12}$ m$^2$/N to $9\times10^{-11}$ m$^2$/N are selected, the optical compensation film having the desired photoelastic coefficient is obtained, and hence a liquid crystal display apparatus having excellent appearance uniformity may be obtained.

Preferred specific examples of the above-mentioned non-crystalline polymer include a (meth)acrylic polymer, a sytrene-based polymer, an olefin-based polymer, a cyclic olefin-based polymer, a polyarylate-based polymer, a polycarbonate-based polymer, a polysulfone-based polymer, a polyurethane-based polymer, a polyimide-based polymer, a polyester-based polymer, a polyvinyl alcohol-based polymer, and copolymers thereof. Further, a cellulose-based polymer and polyvinyl chloride-based polymers such as a polyvinylidene chloride-based polymer may be preferably used. The non-crystalline polymers may be used alone or in combination. Of those, a (meth)acrylic polymer, an olefin-based polymer, a cyclic olefin-based polymer, a polyarylate-based polymer, a polycarbonate-based polymer, a polyurethane-based polymer, and a polyester-based polymer are preferred. Such non-liquid crystal polymers are excellent in transparency and alignment property, and hence the optical compensation film having the birefringence index Δn in the desired ranges may be obtained. As a result, excellent compensation may be realized at a wide viewing angle, and hence a viewing angle compensation effect for excellent contrast may be obtained. The in-plane alignment property and the tilt alignment property normally have a trade-off relationship. However, when the non-liquid crystal polymers having the properties as described above are selected, the optical compensation film may be formed by tilt alignment with a state in which the in-plane alignment property (nx−ny) is high.

Examples of the above-mentioned (meth)acrylic polymer include polymers obtained by copolymerizing (meth)acrylic monomers such as methyl (meth)acrylate, butyl (meth)acrylate, and cyclohexyl (meth)acrylate. In particular, poly methyl methacrylate is preferred.

Preferred examples of the above-mentioned olefin-based polymer include polyethylene and polypropylene.

The above-mentioned cyclic olefin-based polymer is a generic name for a resin polymerized using cyclic olefin as a polymerization unit, and examples thereof include the resins described in Japanese Patent Application Laid-open No. Hei 01-240517, Japanese Patent Application Laid-open No. Hei 03-14882, Japanese Patent Application Laid-open No. Hei 03-122137, and the like. The cyclic olefin-based polymer may be a copolymer of cyclic olefin and another monomer. Specific examples of the cyclic olefin-based polymer include a ring-opened (co)polymer of cyclic olefin, a polymer obtained by an addition polymerization of cyclic olefin, a copolymer (typically, a random copolymer) of cyclic olefin and α-olefin such as ethylene or propylene, a graft denatured polymer obtained by denaturing the polymers with unsaturated carboxylic acid or a derivative thereof, and a hydride thereof. Specific examples of the cyclic olefin include a norborene-based monomer.

Examples of the norbornene-based monomer include: norbornene, alkyl- and/or alkylidene-substituted products thereof such as 5-methyl-2-norbornene, 5-dimethyl-2-norbornene, 5-ethyl-2-norbornene, 5-butyl-2-norbornene, and 5-ethylidene-2-norbornene, and a polar group—(such as halogen—) substituted products thereof; dicyclopentadiene and 2,3-dihydrodicyclopentadiene; dimethanooctahydronaphthalene, alkyl- and/or alkylidene-substituted products thereof, and a polar group—(such as halogen—) substituted products thereof, such as 6-methyl-1,4:5,8-dimethano-1,4,4a,5,6,7,8,8a-octahydronaphthalene, 6-ethyl-1,4:5,8-dimethano-1,4,4a,5,6,7,8,8a-octahydronaphthalene, 6-ethylidene-1,4:5,8-dimethano-1,4,4a,5,6,7,8,8a-octahydronaphthalene, 6-chloro-1,4:5,8-dimethano-1,4,4a,5,6,7,8,8a-octahydronaphthalene, 6-cyano-1,4:5,8-dimethano-1,4,4a,5,6,7,8,8a-octahydronaphthalene, 6-pyridyl-1,4:5,8-dimethano-1,4,4a,5,6,7,8,8a-octahydronaphthalene, and 6-methoxycarbonyl-1,4:5,8-dimethano-1,4,4a,5,6,7,8,8a-octahydronaphthalene; a trimer and a tetramer of cyclopentadiene such as 4,9:5,8-dimethano-3a,4,4a,5,8,8a,9,9a-octahydro-1H-benzoindene and 4, 11:5, 10:6,9-trimethano-3a,4,4a,5,5a,6,9,9a,10,10a,11,11a-dodecahydro-1H-cyclopentaanthracene. The cyclic olefin-based polymer may be a copolymer of a norbornene-based monomer and another monomer.

An aromatic polycarbonate is preferably used as the above-mentioned polycarbonate-based polymer. The aromatic polycarbonate may be typically obtained by the reaction of a carbonate precursor substance with an aromatic diphenol compounds. Specific examples of the carbonate precursor substance include phosgene, diphenols such as bischloroformate, diphenylcarbonate, di-p-tolylcarbonate, phenyl-p-tolylcarbonate, di-p-chlorophenylcarbonate, and dinaphthylcarbonate. Of those, phosgene and diphenylcarbonate are preferred. Specific examples of the aromatic diphenol compound include 2,2-bis(4-hydroxyphenyl)propane, 2,2-bis(4-hydroxy-3,5-dimethylphenyl)propane, bis(4-hydroxyphenyl)methane, 1,1-bis-(4-hydroxyphenyl)ethane, 2,2-bis(4-hydroxyphenyl)butane, 2,2-bis(4-hydroxy-3,5-dimethylphenyl)butane, 2,2-bis(4-hydroxy-3,5-dipropylphenyl)propane, 1,1-bis(4-hydroxyphenyl)cyclohexane, and 1,1-bis(4-hydroxyphenyl)-3,3,5-trimethylcyclohexane. They may be used alone or in combination. Preferably, 2,2-bis(4-hydroxyphenyl)propane, 1,1-bis(4-hydroxyphenyl)cyclohexane, and 1,1-bis(4-hydroxyphenyl)-3,3,5-trimethylcyclohexane are used. Particularly preferably, 2,2-bis(4-hydroxyphenyl)propane and 1,1-bis(4-hydroxyphenyl)-3,3,5-trimethylcyclohexane are used in combination.

Examples of the above-mentioned polyurethane-based polymer include polyester-based polyurethane (such as modified polyester urethane, water-dispersible polyester urethane, and solvent-based polyester urethane), polyether-based polyurethane, and polycarbonate-based polyurethane.

Preferred examples of the above-mentioned polyester-based polymer include polyethylene terephthalate, polybutylene terephthalate, and the like.

A method of manufacturing the optical compensation film according to the present invention typically includes a step of forming the film by the application of a shear stress. The shear stress is applied during the formation of the film, to thereby arrange the non-liquid crystal polymers in a tilt alignment. Examples of the method of forming the film by the application of the shear stress include a method of causing the non-liquid crystal polymers to pass between two belts or rolls which are different in peripheral speed, rotating direction, diameter, shape, or material to obtain a non-liquid crystal polymer film, and a method of applying heat or stress to the non-liquid crystal polymers held between two bases which are different in shrink property and/or stretchability. For example, in the case where the non-liquid crystal polymers are to be caused to pass between the two rolls which are different in peripheral speed, when a peripheral speed difference is increased, the tilt angle may be increased. Any suitable forming method, for example, a casting method or an extrusion method, may be employed as the method of forming the film. The non-liquid crystal polymers used for film formation may be in a melting state. Alternatively, a non-liquid crystal polymer film obtained by film formation may be used.

The manufacturing method described above may include a step of further aligning the non-liquid crystal polymer film obtained in the film forming step described above, if necessary. Examples of the aligning method include a longitudinal uniaxial stretching method, a lateral uniaxial stretching method, and a method of aligning the non-liquid crystal polymer film in the thickness direction. A specific example of the method of aligning the non-liquid crystal polymer film in the thickness direction is a method of attaching shrinkable films to both surfaces of the non-liquid crystal polymer film obtained in the film forming step and performing heat stretching using the longitudinal uniaxial stretching method. For alignment treatment, the aligning methods may be used in combination. When the non-liquid crystal polymer film formed by the application of the shear stress is further aligned, an optical compensation film having a desired in-plane retardation and thickness direction retardation may be obtained. A stretching method and a stretching condition (stretching ratio and temperature) may be appropriately selected based on, for example, the type of the non-liquid crystal polymers and desired optical characteristics.

As described above, when the optical compensation film according to the present invention is to be manufactured, complicated tilt alignment treatment is not required. When stretching treatment or shrinking treatment is performed after tilt alignment, optical characteristics may be easily controlled to obtain a desired retardation. Such retardation control after the tilt alignment cannot be performed for the tilt-alignment type optical compensation film obtained by curing the conventional liquid crystal material. This is one of advantages of the optical compensation film according to the present invention. The alignment treatment may be performed by general stretching treatment, and hence the degree of freedom of setting the film thickness and the film width is high. As a result, the optical compensation film having the desired optical characteristics may be designed in a low cost.

According to the manufacturing method, the film forming step and the aligning step may be successively performed. Therefore, an optical compensation film which is higher in productivity and more uniform in quality than the optical compensation film obtained by performing application, drying, and curing on the conventional liquid crystal material may be obtained.

The thickness of the optical compensation film according to the present invention may be set to any suitable thickness as long as the effects of the present invention are obtained. The thickness is preferably in a range of 10 μm to 300 μm, and more preferably in a range of 20 μm to 200 μm.

The optical compensation film according to the present invention, which is laminated on a polarizer, is smaller in depolarization than the tilt alignment type optical compensation film using the conventional liquid crystal material (for example, product name "WV-film" produced by Fuji Photo Film Co., Ltd.), and hence a polarizing state may be further improved. As a result, a liquid crystal panel (particularly, TN-mode liquid crystal panel) having an excellent front contrast may be obtained. The optical compensation film according to the present invention contains the non-liquid crystal polymers and thus may be suitably used as a protective film for the polarizer.

B. Optical Compensation Film-Integrated Polarizing Plate

An optical compensation film-integrated polarizing plate according to the present invention includes the optical compensation film according to the present invention and the polarizer. The optical compensation film according to the present invention is smaller in depolarization than the tilt alignment type optical compensation film using the conventional liquid crystal material. Therefore, when the optical compensation film according to the present invention is laminated on the polarizer, a higher polarizing state may be obtained.

Figure 2:
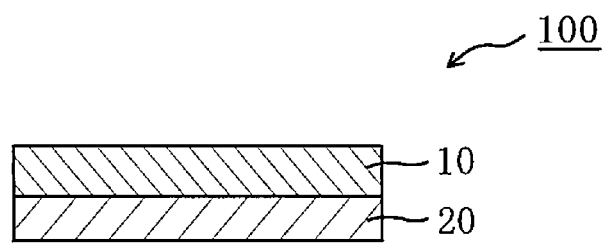
FIG. 2 is a schematic cross sectional view illustrating an optical compensation film-integrated polarizing plate according to a preferred embodiment of the present invention.

FIG. 2 is a schematic cross sectional view illustrating an optical compensation film-integrated polarizing plate according to a preferred embodiment of the present invention. As illustrated in FIG. 2, an optical compensation film-integrated polarizing plate 100 according to the present invention includes a polarizer 10 and an optical compensation film 20. In the optical compensation film-integrated polarizing plate 100, if necessary, any suitable protective film (not shown) may be provided between the polarizer 10 and the optical compensation film 20 and/or on a side of the polarizer 10 on which the optical compensation film 20 is not located. Respective layers (films) included in the optical compensation film-integrated polarizing plate 100 are provided through any suitable pressure-sensitive adhesive layers or adhesive layers (not shown). When the protective film is not provided between the polarizer 10 and the optical compensation film 20, the optical compensation film 20 may serve as a protective film for the polarizer 10.

The polarizer 10 and the optical compensation film 20 are laminated to define any suitable angle by the absorption axis of the polarizer and the slow axis of the optical compensation film. When the optical compensation film-integrated polarizing plate 100 is used for the TN-mode liquid crystal display apparatus, the polarizer 10 and the optical compensation film 20 are preferably laminated so that the absorption axis and the slow axis are substantially perpendicular to each other. Note that, the phrase "substantially perpendicular" exhibits a range of 90°±3°, preferably a range of 90°±1°.

As the above-mentioned polarizer, any suitable polarizer may be adopted depending on purposes. Examples of the polarizer include: a film prepared by adsorbing a dichromatic substance such as iodine or a dichromatic dye on a hydrophilic polymer film such as a polyvinyl alcohol-based film, a partially formalized polyvinyl alcohol-based film, or a partially saponified ethylene/vinyl acetate copolymer-based film and uniaxially stretching the film; a polyene-based aligned film such as a dehydrated product of polyvinyl alcohol or a dehydrochlorinated product of polyvinyl chloride; and the like. Of those, a polarizer prepared by adsorbing a dichromatic substance such as iodine on a polyvinyl alcohol-based film and uniaxially stretching the film is particularly preferred because of high polarized dichromaticity. A thickness of the polarizer is not particularly limited, and is generally about 1 µm to 80 µm.

The polarizer prepared by adsorbing iodine on a polyvinyl alcohol-based film and uniaxially stretching the film may be produced by, for example: immersing a polyvinyl alcohol in an aqueous solution of iodine for coloring; and stretching the film to 3 to 7 times the original length. The aqueous solution may contain boric acid, zinc sulfate, zinc chloride, or the like if needed, or the polyvinyl alcohol-based film may be immersed in an aqueous solution of potassium iodide or the like. Further, the polyvinyl alcohol-based film may be immersed and washed in water before coloring if needed.

Washing the polyvinyl alcohol-based film with water not only allows removal of contamination on the surface of the polyvinyl alcohol-based film or washing away of an anti-blocking agent, but also provides an effect of preventing unevenness such as uneven coloring by swelling the polyvinyl alcohol-based film. The stretching of the film may be performed after coloring of the film with iodine, performed during coloring of the film, or performed followed by coloring of the film with iodine. The stretching may be performed in an aqueous solution of boric acid or potassium iodide, or in a water bath.

C. Liquid Crystal Display Apparatus

Figure 3:
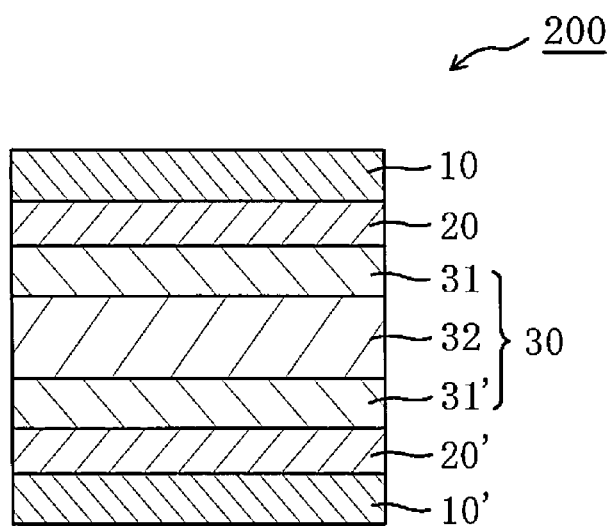
FIG. 3 is a schematic cross sectional view illustrating a liquid crystal panel according to a preferred embodiment of the present invention.
Figure 4A:
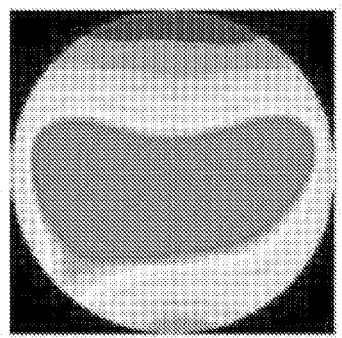
FIG. 4A is a contrast contour diagram illustrating dependence on viewing angle of contrast of a liquid crystal display apparatus according to Example 1 and FIG. 4B illustrates appearance uniformity of the liquid crystal display apparatus.
Figure 4B:
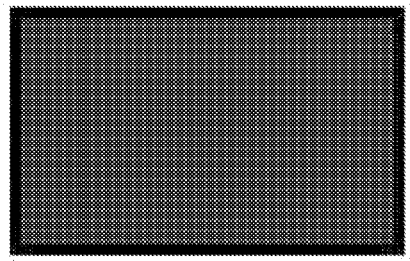
Figure 5A:
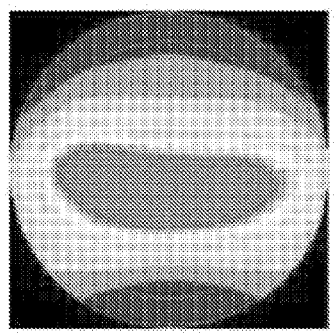
FIG. 5A is a contrast contour diagram illustrating dependence on viewing angle of contrast of a liquid crystal display apparatus according to Example 2 and FIG. 5B illustrates appearance uniformity of the liquid crystal display apparatus.
Figure 5B:
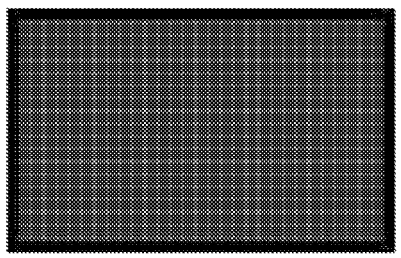
Figure 6A:
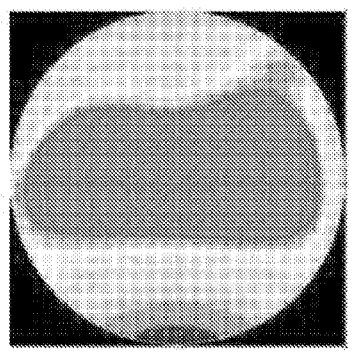
FIG. 6A is a contrast contour diagram illustrating dependence on viewing angle of contrast of a liquid crystal display apparatus according to Example 3 and FIG. 6B illustrates appearance uniformity of the liquid crystal display apparatus.
Figure 6B:
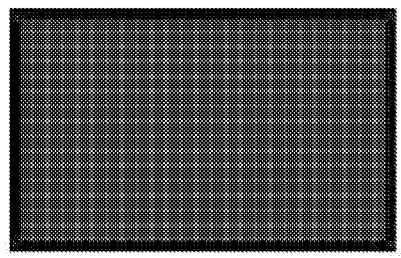
Figure 7A:
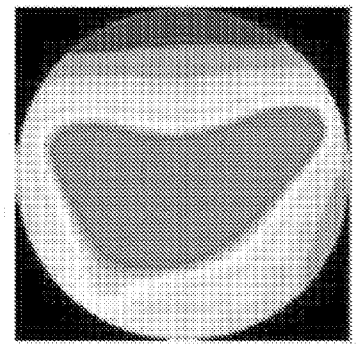
FIG. 7A is a contrast contour diagram illustrating dependence on viewing angle of contrast of a liquid crystal display apparatus according to Example 4 and FIG. 7B illustrates appearance uniformity of the liquid crystal display apparatus.
Figure 7B:
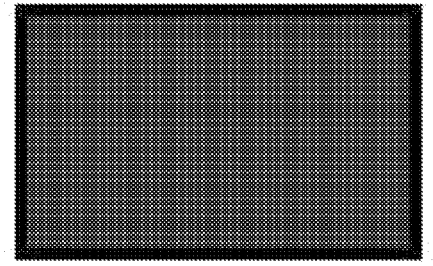
Figure 8A:
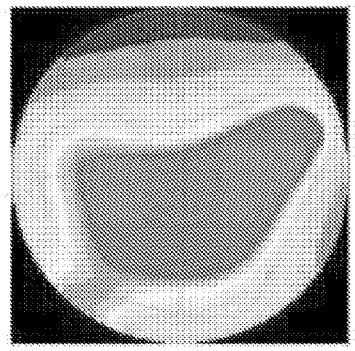
FIG. 8A is a contrast contour diagram illustrating dependence on viewing angle of contrast of a liquid crystal display apparatus according to Example 5 and FIG. 8B illustrates appearance uniformity of the liquid crystal display apparatus.
Figure 8B:
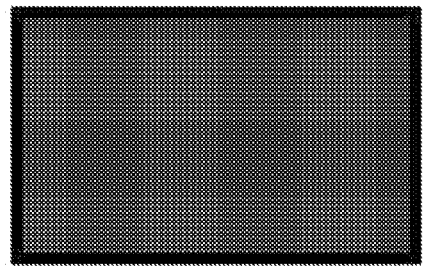
Figure 9A:
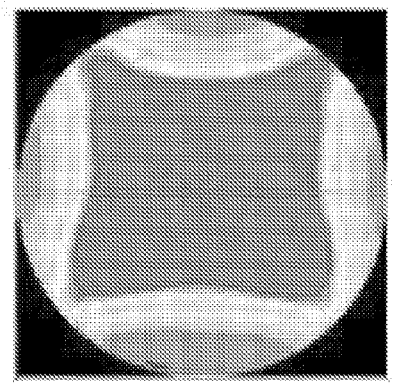
FIG. 9A is a contrast contour diagram illustrating dependence on viewing angle of contrast of a liquid crystal display apparatus according to Comparative Example 1 and FIG. 9B illustrates appearance uniformity of the liquid crystal display apparatus.
Figure 9B:
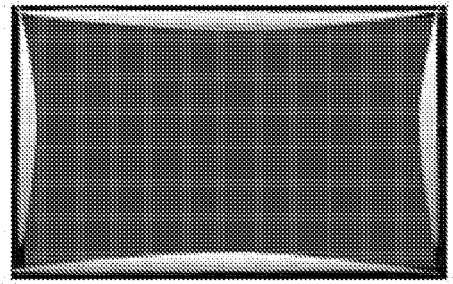

A liquid crystal display apparatus according to the present invention includes: a liquid crystal cell; and one of the optical compensation film described in Section A and the optical compensation film-integrated polarizing plate described in Section B, which is provided on at least one side of the liquid crystal cell. FIG. 3 is a schematic cross sectional view illustrating a liquid crystal panel of a liquid crystal display apparatus according to a preferred embodiment of the present invention. A liquid crystal panel 200 includes: a liquid crystal cell 30; optical compensation films 20 and 20' provided on both sides of the liquid crystal cell 30; and polarizers 10 and 10' provided on sides of the respective optical compensation films which are opposed to the liquid crystal cell. At least one of the optical compensation films 20 and 20' is the optical compensation film according to the present invention, which is described in Section A. The polarizers 10 and 10' are typically provided so that absorption axes thereof are perpendicular to each other. One of the optical compensation films 20 and 20' may be omitted depending on a purpose of the liquid crystal display apparatus according to the present invention and an alignment mode of the liquid crystal cell. The optical compensation film-integrated polarizing plate according to the present invention, which is described in Section B, may be preferably used as the optical compensation film 20 (20') and the polarizer 10 (10').

The liquid crystal cell 30 includes a pair of glass substrates 31 and 31' and a liquid crystal layer 32 as a display medium provided between the substrates. One substrate (active matrix substrate) 31' includes a switching element (typically TFT) for controlling electrooptic properties of liquid crystal, a scanning line for providing a gate signal to the switching element, and a signal line for providing a source signal thereto (all not shown). The other substrate (color filter substrate) 31 includes a color filter (not shown). Note that, the color filter may be provided on the active matrix substrate 31' as well. A distance (cell gap) between the substrates 31 and 31' is controlled by a spacer (not shown). An alignment film (not shown) formed of, for example, polyimide is provided on a side of each of the substrates 31 and 31', which is in contact with the liquid crystal layer 32.

As the driving mode of the liquid crystal cell, any suitable driving mode may be adopted as long as the effects of the present invention are obtained. The driving mode is preferably a twisted nematic (TN) mode, a bend nematic (OCB) mode, or an electrically controlled birefringence (ECB) mode. Of those, the TN mode is more preferred. This is because the driving mode and the optical compensation film or the optical compensation film-integrated polarizing plate as described above are used in combination, and hence an excellent viewing angle improvement effect may be obtained.

The liquid crystal cell of the TN mode described above is a liquid crystal cell in which a nematic liquid crystal having positive dielectric anisotropy is held between two substrates and orientations of liquid crystal molecules are twisted by 90 degrees by surface alignment treatment of a glass substrate. To be specific, there are a liquid crystal cell described in "Liquid Crystal Dictionary", Baifukan Co., Ltd., p. 158 (1989) and a liquid crystal cell described in Japanese Patent Application Laid-open No. Sho 63-279229.

The liquid crystal cell of the bend nematic (OCB: optically compensated bend or optically compensated birefringence) mode is a liquid crystal cell in which, when no voltage is applied, a nematic liquid crystal having positive dielectric anisotropy is bend-aligned between transparent electrodes while a central portion thereof is twist-aligned, based on an electrically controlled birefringence (ECB) effect. The OCB mode liquid crystal cell is also called "π cell". To be specific, there are a liquid crystal cell described in "Next Generation Liquid Crystal Display", Kyoritsu Shuppan Co., Ltd., pp. 11-27 (2000) and a liquid crystal cell described in Japanese Patent Application Laid-open No. Hei 07-084254.

In the ECB mode, when no voltage is applied, liquid crystal molecules in the liquid crystal cell are aligned in a predetermined direction. When a voltage is applied, the liquid crystal molecules are tilted at a predetermined angle with respect to the predetermined direction, and hence a polarizing state is changed for display based on the birefringence effect. In the ECB mode, the tilt of the liquid crystal molecules is changed depending on an applied voltage value and a transmission light intensity is changed depending on the changed tilt. Therefore, when white light is caused to enter the liquid crystal cell, light passing through an analyzer (polarizer located on viewer side) is colored by an interference phenomenon and a hue of the colored light is changed depending on the tilt of the liquid crystal molecules (applied voltage value). As a result, the ECB mode has an advantage that color display may be achieved by a simple structure (for example, without providing color filter). In the present invention, as long as the driving mechanism (display mechanism) as described above is provided, any suitable ECB mode may be employed. Specific examples thereof include a homeotropic (DAP: Deformation of Vertically Aligned Phases) system, a homogeneous system, and a hybrid (HAN: Hybrid Aligned Nematic) system.

The application of the liquid crystal display apparatus of the present invention is not particularly limited, and the liquid crystal display apparatus can be used in various applications: for example, office automation (OA) devices such as personal computer monitors, laptop personal computers, and photocopying machines; portable devices such as cellular phones, watches, digital cameras, personal digital assistances (PDA), and portable game machines; home appliances such as video cameras, liquid crystal televisions, and microwaves; on-vehicle devices such as back monitors, car navigation system monitors, and car audios; exhibition devices such as commercial information monitors; security devices such as surveillance monitors; and nursing care and medical devices such as nursing monitors and medical monitors.

Hereinafter, the present invention is specifically described with reference to Examples. However, the present invention is not limited to Examples. Respective measurement methods used in Examples and Comparative Example were as follows.
(1) Birefringence Index Birefringence indices were measured using an Abbe refractometer (product name "DR-M4", produced by Atago Co., Ltd.).
(2) Retardation Value (Re[590], Rth[590])

Retardation values were measured using "Axoscan" (product name) produced by Axometrics, Inc. at a wavelength of 590 nm and 23° C.
(3) Average Tilt Angle The refractive indices $n_a$, $n_b$, and $n_c$ and the retardation values δ (retardation values measured at 5° intervals in polar angle range of −50° to +50° (normal direction corresponds to 0°) in direction vertical to slow axis) were substituted into Expressions (I) and (II) described below to obtain the average tilt angle (β). The retardation values to be used were measured using "Axoscan" (product name) produced by Axometrics, Inc. at a wavelength of 590 nm and 23° C. The used respective refractive indices were measured using the Abbe refractometer (product name "DR-M4", produced by Atago Co., Ltd.).

$$\delta = \frac{d}{\cos\theta'}\left(\frac{n_b n_c}{\sqrt{n_b^2 \sin^2(\theta' - \beta) + n_c^2 \cos^2(\theta' - \beta)}} - n_a\right) \quad (I)$$

$$\theta' = \arcsin\left(\frac{\sin\theta}{(n_a + n_b + n_c)/3}\right) \quad (II)$$

(4) Front Contrast

Y-values in an XYZ-display system in a case where a white image and a black image are displayed on the liquid crystal display apparatus were measured using a luminance meter ("BM-5", produced by Topcon Corporation). A contrast ratio in a front direction ("YW/YB") was calculated based on a Y-value obtained in the case of the white image (YW: white brightness) and a Y-value obtained in the case of the black image (YB: black brightness).
(5) Viewing Angle Characteristic (Dependence on Viewing Angle of Contrast)

While the white image and the black image were displayed on the liquid crystal display apparatus, the viewing angle characteristic was measured using "Conoscope" (product name) produced by Autronic Melchers GmbH.
(6) Film Thickness A film thickness was measured using "MCPD-3000" (product name) produced by Otsuka Electronics Co., Ltd.
(7) Appearance Uniformity The liquid crystal display apparatus was maintained at 80° C. for 200 hours or at 60° C. and 90% RH for 200 hours, and then a black image was displayed thereon at room temperature for 30 minutes. After that, the black image was visually inspected at a distance of approximately several meters to determine whether or not there was a light leakage portion. A brightness distribution of the entire screen area of the liquid crystal display apparatus on which the black image is displayed was measured using a luminance meter (product name "CA1500", produced by Konica Minolta Sensing, Inc.). A ratio between minimum brightness and maximum brightness in the screen was calculated as a brightness ratio (maximum brightness/minimum brightness).

EXAMPLE 1

A polycarbonate-based polymer film was heated at 200° C. and caused to pass between two rolls (roll-A and roll-B) having different peripheral speeds (peripheral speed of roll-A was 5.0 m/min. and peripheral speed of roll-B was 7.5 m/min.) to obtain a film having a thickness of 150 μm. After that, the obtained film was laterally and uniaxially stretched by 1.5 times to obtain an optical compensation film-1 having a thickness of 100 μm. In the optical compensation film-1, the birefringence index Δn was 0.0013, the in-plane retardation value Re was 100 nm, the thickness direction retardation Rth was 130 nm, and the average tilt angle β was 44°. That is, the optical compensation film-1 was a biaxial tilt alignment type optical compensation film satisfying the refractive index relationship of "nx>ny>nz".

A polyvinyl alcohol film was dyed in an aqueous solution containing iodine, and thereafter, the resultant film was uniaxially stretched by 6 times between rolls having different peripheral speeds in an aqueous solution containing boric acid to thereby obtain a polarizer. The above-mentioned optical compensation film-1 was attached on one surface of the polarizer via a polyvinyl alcohol-based adhesive (0.1 μm in thickness). In this case, the polarizer and the optical compensation film-1 were laminated so that the absorption axis of the polarizer and the slow axis of the optical compensation film-1 were perpendicular to each other. Then, a protective film (triacetylcellulose film (product name "KC4UYW") produced by Konica Minolta Opto, Inc. at thickness of 40 μm) was attached to the other surface of the polarizer through a polyvinyl alcohol-based adhesive (0.1 μm in thickness) to obtain an optical compensation film-integrated polarizing plate-1.

A liquid crystal panel was taken out from a 20-inch liquid crystal monitor including a TN-mode liquid crystal cell (product name "SyncMaster T240", produced by Samsung). Polarizing plates provided on both sides of the liquid crystal cell were removed and glass surfaces (surfaces of the front substrate and the rear substrate) of the liquid crystal cell were cleaned. Subsequently, the plurality of optical compensation film-integrated polarizing plates-1 were respectively attached to the viewer-side surface and backlight-side surface of the liquid crystal cell by acrylic-based pressure-sensitive adhesives (20 μm in thickness). In this case, the optical compensation film-integrated polarizing plates-1 were laminated so that the optical compensation films-1 were located on the liquid crystal cell sides and the absorption axes of the polarizers located on the viewer side and the backlight side were perpendicular to each other. The obtained liquid crystal panel was assembled into the original liquid crystal monitor to obtain a liquid crystal display apparatus-1. A front contrast, viewing angle characteristic, and appearance uniformity of the obtained liquid crystal display apparatus-1 were measured. Results are shown in Table 1 and FIGS. 4A and 4B. FIGS. 4A, 5A, 6A, 7A, 8A, and 9A illustrate contrast distributions in all azimuths and angles in cases where a viewing angle is changed from a front direction. FIGS. 4B, 5B, 6B, 7B, 8B, and 9B illustrate brightness distributions of the entire black image region. In FIGS. 4B, 5B, 6B, 7B, 8B, and 9B, a black part exhibits a low-brightness state, a white part exhibits a high-brightness state, and an all-black state exhibits a normal display state.

EXAMPLE 2

A pellet of polypropylene was melted at 115° C., and then extruded from a die and caused to flow between two belts which are different in rotating direction from each other and have a peripheral speed of 2.7 m/min., to obtain a film having a thickness of 80 μm. After that, the obtained film was laterally and uniaxially stretched by 1.8 times to obtain an optical compensation film-2 having a thickness of 50 μm. In the optical compensation film-2, the birefringence index Δn was 0.0016, the in-plane retardation value Re was 20 nm, the thickness direction retardation Rth was 80 nm, and the average tilt angle β was 44°. That is, the optical compensation film-2 was a biaxial tilt alignment type optical compensation film satisfying the refractive index relationship of "nx>ny>nz".

The same process as in Example 1 except for the use of the optical compensation film-2 instead of the optical compensation film-1 was performed to obtain an optical compensation film-integrated polarizing plate-2 and a liquid crystal display apparatus-2. A front contrast, viewing angle characteristic, and appearance uniformity of the obtained liquid crystal display apparatus-2 were measured. Results are shown in Table 1 and FIGS. 5A and 5B.

EXAMPLE 3

A pellet of cyclic olefin polymer was melted at 280° C., and then extruded from a die and caused to flow between two rolls (roll-A and roll-B) having different peripheral speeds (peripheral speed of roll-A was 4.0 m/min. and peripheral speed of roll-B was 5.4 m/min.) to obtain a film having a thickness of 110 μm. After that, the obtained film was laterally and uniaxially stretched by 1.2 times to obtain an optical compensation film-3 having a thickness of 100 μm. In the optical compensation film-3, the birefringence index Δn was 0.0012, the in-plane retardation value Re was 83 nm, the thickness direction retardation Rth was 120 nm, and the average tilt angle β was 40°. That is, the optical compensation film-3 was a biaxial tilt alignment type optical compensation film satisfying the refractive index relationship of "nx>ny>nz".

The same process as in Example 1 except for the use of the optical compensation film-3 instead of the optical compensation film-1 was performed to obtain an optical compensation film-integrated polarizing plate-3 and a liquid crystal display apparatus-3. A front contrast, viewing angle characteristic, and appearance uniformity of the obtained liquid crystal display apparatus-3 were measured. Results are shown in Table 1 and FIGS. 6A and 6B.

EXAMPLE 4

A pellet of urethane polymer was melted at 230° C., and then extruded from a die and caused to flow between two rolls (roll-A and roll-B) having different peripheral speeds (peripheral speed of roll-A was 5.0 m/min. and peripheral speed of roll-B was 6.5 m/min.) to obtain a film, having a thickness of 155 μm. After that, the obtained film was laterally and uniaxially stretched by 1.2 times to obtain an optical compensation film-4 having a thickness of 150 μm. In the optical compensation film-4, the birefringence index Δn was 0.0004, the in-plane retardation value Re was 50 nm, the thickness direction retardation Rth was 60 nm, and the average tilt angle β was 40°. That is, the optical compensation film-4 was a biaxial tilt alignment type optical compensation film satisfying the refractive index relationship of "nx>ny>nz".

The same process as in Example 1 except for the use of the optical compensation film-4 instead of the optical compensation film-1 was performed to obtain an optical compensation film-integrated polarizing plate-4 and a liquid crystal display apparatus-4. A front contrast, viewing angle characteristic, and appearance uniformity of the obtained liquid crystal display apparatus-4 were measured. Results are shown in Table 1 and FIGS. 7A and 7B.

EXAMPLE 5

A pellet of polycarbonate polymer was melted at 230° C., and then extruded from a die and caused to flow between two rolls (roll-A and roll-B) having different peripheral speeds (peripheral speed of roll-A was 5.0 m/min. and peripheral speed of roll-B was 5.5 m/min.) to obtain a film having a thickness of 100 μm. After that, the obtained film was laterally and uniaxially stretched by 1.2 times to obtain an optical compensation film-5 having a thickness of 95 μm. In the optical compensation film-5, the birefringence index Δn was 0.0014, the in-plane retardation value Re was 76 nm, the thickness direction retardation Rth was 133 nm, and the average tilt angle β was 33°. That is, the optical compensation film-5 was a biaxial tilt alignment type optical compensation film satisfying the refractive index relationship of "nx>ny>nz".

The same process as in Example 1 except for the use of the optical compensation film-5 instead of the optical compensation film-1 was performed to obtain an optical compensation film-integrated polarizing plate-5 and a liquid crystal display apparatus-5. A front contrast, viewing angle characteristic, and appearance uniformity of the obtained liquid crystal display apparatus-5 were measured. Results are shown in Table 1 and FIGS. 8A and 8B.

COMPARATIVE EXAMPLE 1

The same process as in Example 1 except for the use of "WV-film" (product name, produced by Fuji Photo Film Co., Ltd.) instead of the optical compensation film-1 was performed to obtain an optical compensation film-integrated polarizing plate-c1 and a liquid crystal display apparatus-c1. A front contrast, viewing angle characteristic, and appearance uniformity of the obtained liquid crystal display apparatus-c1 were measured. Results are shown in Table 1 and FIGS. 9A and 9B. In "WV-film", the in-plane retardation value Re was 40 nm, the thickness direction retardation Rth was 165 nm, and the average tilt angle β was 16°.

TABLE 1

|  | Birefringence index (Δn) | Re[590] (nm) | Rth[590] (nm) | Δn450/ Δn550 | Average tilt angle (β°) | Front contrast | Brightness ratio |
|---|---|---|---|---|---|---|---|
| Example 1 | 0.0013 | 100 | 130 | 1.12 | 44 | 1200 | 1.2 |
| Example 2 | 0.0016 | 20 | 80 | 1.04 | 44 | 1220 | 1.3 |

TABLE 1-continued

| | Birefringence index (Δn) | Re[590] (nm) | Rth[590] (nm) | Δn450/Δn550 | Average tilt angle (β°) | Front contrast | Brightness ratio |
|---|---|---|---|---|---|---|---|
| Example 3 | 0.0012 | 83 | 120 | 1.004 | 40 | 1400 | 1.03 |
| Example 4 | 0.0004 | 50 | 60 | 1.05 | 40 | 1202 | 1.2 |
| Example 5 | 0.0014 | 76 | 133 | 1.005 | 33 | 1555 | 1.3 |
| Comparative Example 1 | — | 40 | 165 | — | 16 | 1002 | 10.3 |

As shown in Table 1, each of the optical compensation films obtained in Examples was a biaxial tilt alignment type optical compensation film including non-liquid crystal polymers. As illustrated in FIGS. 4A, 4B, 5A, 5B, 6A, 6B, 7A, 7B, 8A, 8B, 9A, and 9B and Table 1, the liquid crystal display apparatuses using optical compensation films according to the present invention had high contrasts at a wide viewing angle and were far superior to the liquid crystal display apparatus according to Comparative Example 1 in view of the appearance uniformity. As shown in Table 1, the obtained front contrasts were excellent as compared with the liquid crystal display apparatus according to Comparative Example 1. Therefore, according to the optical compensation films of the present invention, as in the case of the tilt alignment type optical compensation film using the conventional liquid crystal material, the viewing angle compensation may be suitably performed for liquid crystal display apparatuses (particularly, TN-mode liquid crystal display apparatuses). In addition, liquid crystal display apparatuses which are more excellent in appearance uniformity and front contrast than the tilt alignment type optical compensation film using the conventional liquid crystal material may be obtained. The optical compensation films according to the present invention do not require a complicated manufacturing process, and hence excellent cost performance may be obtained as compared with the tilt alignment type optical compensation film using the conventional liquid crystal material. In FIGS. 4A, 4B, 5A, 5B, 6A, 6B, 7A, 7B, 8A, 8B, 9A, and 9B, a region in which a contrast value (ratio between brightness during white display and brightness during black display) is equal to or larger than 100 is colored with pink and a region in which a contrast value is equal to or smaller than 10 is colored with blue. A displayed gradation is changed from blue to pink as the contrast value increases.

The optical compensation film and the optical compensation film-integrated polarizing plate according to the present invention may be suitably used for liquid crystal display apparatuses. The optical compensation film and the optical compensation film-integrated polarizing plate according to the present invention may be more suitably used for liquid crystal display apparatuses of TN-mode, OCB-mode, or ECB-mode.

Many other modifications will be apparent to and be readily practiced by those skilled in the art without departing from the scope and spirit of the invention. It should therefore be understood that the scope of the appended claims is not intended to be limited by the details of the description but should rather be broadly construed.

What is claimed is:

1. An optical compensation film, comprising:
non-liquid crystal polymers arranged in a tilt alignment, wherein the optical compensation film satisfies the following expressions (1) and (2):

$$3 [nm] \leq (nx-ny) \times d; \quad (1)$$

and $$5° < \beta, \quad (2)$$

where, when an X-axis and a Y-axis, which are plane direction axes of a three-dimensional coordinate system, are perpendicular to each other and an axis vertical to the X-axis and the Y-axis in a thickness direction is defined as a Z-axis, nx and ny indicate a maximum refractive index and a minimum refractive index in an XY-plane of the optical compensation film, respectively, d indicates a film thickness [nm], and β indicates an angle formed between a direction for providing the minimum refractive index ny and a direction for providing a maximum refractive index nb in a YZ-plane of the optical compensation film, and
wherein the optical compensation film has a birefringence index Δn in a range of 0.0001 to 0.02 and the non-liquid crystal polymers comprise at least one polymer selected from the group consisting of a (meth)acrylic polymer, an olefin-based polymer, a cyclic olefin-based polymer, a polyacrylate-based polymer, a polycarbonate-based polymer, and a polyurethane-based polymer.

2. An optical compensation film according to claim 1, wherein the optical compensation film has a photoelastic coefficient in a range of $1 \times 10^{-12}$ m²/N to $9 \times 10^{-11}$ m²/N.

3. An optical compensation film according to claim 1, wherein the optical compensation film satisfies a refractive index relationship of one of nx>ny>nz and nx>ny=nz, where nz indicates a refractive index in a thickness direction.

4. An optical compensation film-integrated polarizing plate, comprising:
the optical compensation film according to claim 1; and
a polarizer provided adjacent to the optical compensation film.

5. An optical compensation film-integrated polarizing plate according to claim 4, wherein the optical compensation film serves as a protective film for the polarizer.

6. A liquid crystal display apparatus, comprising:
a liquid crystal cell; and
the optical compensation film-integrated polarizing plate according to claim 4, which is provided on at least one of sides of the liquid crystal cell.

7. A liquid crystal display apparatus according to claim 6, wherein the liquid crystal cell is in a driving mode selected from the group consisting of a TN mode, an OCB mode, and an ECB mode.

8. A liquid crystal display apparatus, comprising:
a liquid crystal cell; and
the optical compensation film according to claim 1, which is provided on at least one of sides of the liquid crystal cell.

9. A liquid crystal display apparatus according to claim 8, wherein the liquid crystal cell is in a driving mode selected from the group consisting of a TN mode, an OCB mode, and an ECB mode.

10. An optical compensation film, comprising:
non-liquid crystal polymers arranged in a tilt alignment,
wherein, when an X-axis and a Y-axis, which are plane direction axes of a three-dimensional coordinate system, are perpendicular to each other and an axis vertical to the X-axis and the Y-axis in a thickness direction is defined as a Z-axis, the optical compensation film includes two optical axes in a plane which is not parallel to any of an XY-plane, a YZ-plane, and a ZX-plane of the optical compensation film, and
wherein the optical compensation film has a birefringence index $\Delta n$ in a range of 0.0001 to 0.02 and the non-liquid crystal polymers comprise at least one polymer selected from the group consisting of a (meth)acrylic polymer, an olefin-based polymer, a cyclic olefin-based polymer, a polyacrylate-based polymer, a polycarbonate-based polymer, and a polyurethane-based polymer.

11. An optical compensation film according to claim 10, wherein the optical compensation film includes an alignment axis in a direction vertical to a tilt direction of the non-liquid crystal polymers.

12. An optical compensation film according to claim 10, wherein the optical compensation film has a photoelastic coefficient in a range of $1 \times 10^{-12}$ m$^2$/N to $9 \times 10^{-11}$ m$^2$/N.

13. An optical compensation film according to claim 10, wherein the optical compensation film satisfies a refractive index relationship of one of nx>ny>nz and nx>ny=nz.

14. An optical compensation film-integrated polarizing plate, comprising:
the optical compensation film according to claim 10; and
a polarizer provided adjacent to the optical compensation film.

15. An optical compensation film-integrated polarizing plate according to claim 14, wherein the optical compensation film serves as a protective film for the polarizer.

16. A liquid crystal display apparatus, comprising:
a liquid crystal cell; and
the optical compensation film according to claim 10, which is provided on at least one of sides of the liquid crystal cell.

17. A liquid crystal display apparatus according to claim 16, wherein the liquid crystal cell is in a driving mode selected from the group consisting of a TN mode, an OCB mode, and an ECB mode.

* * * * *

UNITED STATES PATENT AND TRADEMARK OFFICE
CERTIFICATE OF CORRECTION

Page 1 of 1

PATENT NO.        : 8,730,434 B2
APPLICATION NO.   : 13/081673
DATED             : May 20, 2014
INVENTOR(S)       : Nao Murakami et al.

It is certified that error appears in the above-identified patent and that said Letters Patent is hereby corrected as shown below:

In the Claims column 18, line 29
Change

"index An in a range of"

To Be

--index Δn in a range of-- column 19, line 12
Change

"index An in a range of"

To Be

--index Δn in a range of--

Signed and Sealed this
Twenty-ninth Day of March, 2016

Michelle K. Lee
*Director of the United States Patent and Trademark Office*